(12) United States Patent
Aillaud et al.

(10) Patent No.: US 8,385,309 B2
(45) Date of Patent: Feb. 26, 2013

(54) COMMUNICATION SET UP BETWEEN WIRELESS DEVICES

(75) Inventors: Christophe Aillaud, Fuveau (FR); Henri Ohanian, Ceyreste (FR)

(73) Assignee: Gemalto SA, Meudon (FR)

( * ) Notice: Subject to any disclaimer, the term of this patent is extended or adjusted under 35 U.S.C. 154(b) by 936 days.

(21) Appl. No.: 11/795,500

(22) PCT Filed: Dec. 9, 2005

(86) PCT No.: PCT/EP2005/056637
§ 371 (c)(1),
(2), (4) Date: Jan. 31, 2008

(87) PCT Pub. No.: WO2006/076990
PCT Pub. Date: Jul. 27, 2006

(65) Prior Publication Data
US 2008/0212558 A1 Sep. 4, 2008

(30) Foreign Application Priority Data
Jan. 19, 2005 (FR) ...................................... 05 00543

(51) Int. Cl.
*H04J 3/00* (2006.01)
*H04L 12/66* (2006.01)
(52) U.S. Cl. ........................................ 370/345; 370/463
(58) Field of Classification Search ........................ None
See application file for complete search history.

(56) References Cited

U.S. PATENT DOCUMENTS

| | | | |
|---|---|---|---|
| 7,315,522 B2* | 1/2008 | Wood, Jr. ...................... | 370/312 |
| 2002/0046226 A1* | 4/2002 | Nakabe et al. ................. | 708/250 |
| 2002/0104890 A1* | 8/2002 | Yoshimoto et al. ............ | 235/492 |
| 2003/0094491 A1* | 5/2003 | Nakabe et al. ................. | 235/451 |
| 2003/0116626 A1* | 6/2003 | Nakabe et al. ................. | 235/451 |

(Continued)

FOREIGN PATENT DOCUMENTS

| EP | 0 949 595 A2 | 10/1999 |
|---|---|---|
| EP | 1 575 005 A2 | 9/2005 |

(Continued)

OTHER PUBLICATIONS

PCT/ISA/210.

(Continued)

*Primary Examiner* — Chirag Shah
*Assistant Examiner* — Suk Jin Kang
(74) *Attorney, Agent, or Firm* — Buchanan Ingersoll & Rooney PC

(57) ABSTRACT

A slave wireless device includes several applications, a wireless communication interface and a processing module. The processing module interprets a presentation request and time-slotted markers received on the communication interface, selects several applications or application groups corresponding to the presentation request, and transmits the wireless slave device identifier distinctive for each application or application group selected in the distinctive time slot in response to the presentation request. The slave device is thus enabled to indicate several application groups in response to a single presentation request.

6 Claims, 1 Drawing Sheet

U.S. PATENT DOCUMENTS

| | | | |
|---|---|---|---|
| 2004/0012486 A1* | 1/2004 | Mani | 340/10.2 |
| 2004/0127256 A1* | 7/2004 | Goldthwaite et al. | 455/558 |
| 2004/0146066 A1 | 7/2004 | Palmade | |
| 2004/0182926 A1* | 9/2004 | Nakabe et al. | 235/435 |
| 2005/0127180 A1* | 6/2005 | Matsumoto et al. | 235/451 |
| 2005/0184163 A1* | 8/2005 | de Jong | 235/492 |
| 2005/0184164 A1* | 8/2005 | de Jong | 235/492 |
| 2005/0184165 A1 | 8/2005 | de Jong | |
| 2005/0218234 A1 | 10/2005 | Gonzalvo et al. | |
| 2006/0022042 A1* | 2/2006 | Smets et al. | 235/451 |
| 2006/0163365 A1* | 7/2006 | Nakabe | 235/492 |
| 2006/0175406 A1* | 8/2006 | Dressen | 235/451 |
| 2007/0273486 A1* | 11/2007 | Shiotsu et al. | 340/10.34 |

FOREIGN PATENT DOCUMENTS

| | | |
|---|---|---|
| FR | 2 841 997 | 1/2004 |
| GB | 2 396 530 A | 6/2004 |

OTHER PUBLICATIONS

PCT/ISA/237.

\* cited by examiner

COMMUNICATION SET UP BETWEEN WIRELESS DEVICES

CROSS-REFERENCE TO RELATED APPLICATIONS

This application is the United States National Phase under 35 U.S.C. 371 of PCT International Patent Application No. PCT/EP2005/056637, filed on Dec. 9, 2005, and claiming priority to French Application No. 0500543, filed on Jan. 19, 2005.

FIELD OF THE INVENTION

The invention relates to radio frequency communications between a master wireless device and slave wireless devices. The invention concerns in particular the setting up of a communication via an application identification request transmitted from a master device and via responses from slave devices in time slots defined by the master device.

BACKGROUND OF THE INVENTION

The standard ISO 14443 defines the requirements for a radio frequency transaction between a wireless smart card and a terminal.

The transaction comprises a plurality of successive phases. During a first phase, known as switching on, the radio frequency interface of the terminal is switched on and reinitialised. The terminal transmits with a 13.56 MHz carrier. The cards located in the transmission field rectify the carrier transmitted in order to supply their circuits.

During a second phase, known as startup and anti-collision phase, the terminal determines the presence of one or more cards in its transmission field. According to ISO 14443-3 type B, the terminal transmits in particular a request requiring that the cards located in its transmission field present themselves and defining a number of response time slots. The terminal also defines the response time slots, the end of transmission of the request launching the first time slot. FIG. 1 illustrates said operation: the REQB4SM request of the terminal announces 4 response time slots for the various cards in its transmission field. The first time slot starts at the end of the REQB4SM request. The terminal then transmits SM2, SM3 and SM4 slot markers the end of which marks the start of the second, third and fourth time slots.

Two cards respond to the REQB4SM request. The cards respond respectively via the ATQB1 and ATQB2 response frames. Each card responds in a distinctive time slot via a single response frame. An ATQB response comprises the following data: a pseudo-random card identifier for the communication parameters and information for the execution of an application by default. The information comprises in particular an identifier of the single application group (designated by the AFI acronym in English) by default in the card. The information also comprises the number of loaded applications associated with this application group along with the total number of applications loaded in the card. The terminal thus determines the characteristics of said cards and selects one or more.

During a third phase, known as activity phase, command exchanges are performed between the terminal and a selected card to enable execution of an application group (transport, bank operation, counting of loyalty points, identity check, etc.) during the transaction.

More and more frequently, a smart card has a plurality of distinctive applications, application groups or sub-groups. In order to declare said various applications or application groups, a known method proposes carrying out a plurality of successive startup and anti-collision phases. At each new phase, the identifier of the single application group by default is associated with another application or application group.

Said method has disadvantages. Some transactions, such as the authorisation of passage of a user at a tube portico or toll, require a total execution time less than 100 milliseconds. The duration (and thus the number) of startup and anti-collision phases must therefore be limited. Thus, all of the applications or application groups cannot be declared in such a transaction.

SUMMARY OF THE INVENTION

There is therefore a need for a slave wireless device comprising:
a plurality of applications
a wireless communication interface;
a processing module, suitable for interpreting a presentation request and received contact time-slotted markers, suitable for selecting on the interface a plurality of applications or application groups corresponding to the presentation request, suitable for transmitting a distinctive slave wireless device identifier for each application or application group selected, in a distinctive time slot, in response to the presentation request.

According to one variant, the processing module is suitable for generating said wireless device identifiers and associating them with the respective applications or application groups, before or during the startup of the presentation request.

According to yet another variant, the device comprises an identifier distinctive for each application or application group, the processing module being suitable for transmitting the identifier of an application or application group in the transmission time slot of the slave device identifier associated with said application or application group.

According to another variant, the slave wireless device is a smart card.

The invention also concerns a method for setting up a wireless communication comprising the following steps:
a master wireless device transmits a presentation request defining at least the applications or application groups sought, and defines response time slots;
at least one slave wireless device such as above defined and arranged in the transmission field selects applications or application groups and transmits a slave wireless device identifier distinctive for each application or application group selected, in a distinctive time slot, in response to the presentation request.

According to one variant, the processing module generates said wireless device identifiers and associates them to the respective applications or application groups before or during the presentation request.

According to yet another variant, the processing module transmits an identifier distinctive for each application or application group selected in the transmission time slot of the slave device identifier associated with said application or application group selected.

According to another variant, the transmissions between the master and slave wireless devices comply with the specifications of the standard ISO 14443-3 type B.

BRIEF DESCRIPTION OF THE DRAWINGS

The invention will be better understood by reading the following description, accompanied with the appended drawings which show.

DETAILED DESCRIPTION OF THE INVENTION

The invention proposes to respond to a presentation request of a master wireless device via a plurality of responses of the same slave wireless device, declaring a plurality of its applications or application groups in distinctive response time slots. A distinctive slave wireless device identifier is associated with each application or application group and transmits in response to the request. A plurality of slave wireless devices are declared virtually via a single slave wireless device. The same slave wireless device may therefore use a plurality of response time slots originally planned for a single response of each of the slave wireless devices arranged in the transmission field of the master wireless device.

A plurality of applications or application groups may thus be declared by a slave wireless device in the reduced time of a single startup and anti-collision phase. The transaction time between the master and slave wireless devices is thus not extended.

The application of the invention to the specifications of the standard ISO 14443-3 type B described later is only provided by way of example, the invention being applicable to protocols wherein a similar problem arises. Likewise, the invention is described in its application to a terminal and to a smart card but is applicable for other master and slave wireless devices.

Figure 1:
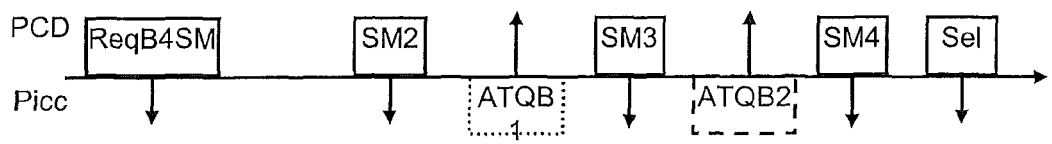
FIG. 1, exchanges according to prior art between a terminal and a smart card during the startup and anti-collision phase.
Figure 2:
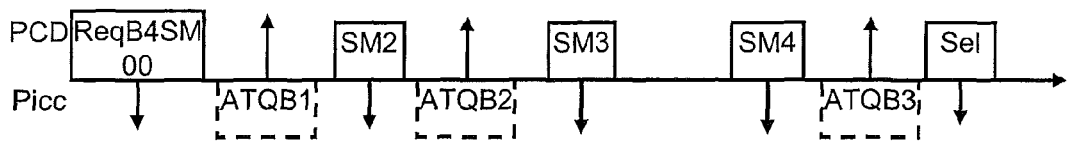
FIGS. 2 to 4, various exchange scenarios according to the invention between a terminal and a smart card during the startup and anti-collision phase.

FIG. 2 illustrates a time chart of a first example of exchanges during a startup and anti-collision phase. The transmissions of the terminal and of a first smart card are illustrated respectively on the top (PCD) and bottom parts (Picc) of the time chart.

During a first step, the terminal transmits a ReqB4SM00 presentation request of the smart cards arranged in its transmission field. Said request may take the following form:

05h 00h 02h CRCB

The first parameter is an identifier of the terminal. The second parameter defines the application or the application group/groups requested (identified by an AFI) for the smart cards that must respond. In this case, the value 00h defines that any card in the field must respond, irrespective of its applications. The third parameter defines the number of response time slots to the request. In this case, the 02h value defines the use of 4 time slots. The end of the request marks the start of the first time slot.

A first smart card arranged in the transmission field receives the presentation request on its wireless communication interface and its processing module processes the request. Said smart card has 2 transport applications, identified by the respective 12h and 13h AFI, belonging to the lxh application group. The smart card has a bank application identified by the 21h AFI belonging to the 2xh application group. The processing module therefore selects the applications which correspond to the request from the terminal. In this case, all of the applications are selected.

The processing module therefore commands the transmission of a response for each application in a distinctive time slot. The time slots other than the first are defined on expiry of the SM2 to SM4 markers transmitted by the terminal. The ATQB1, ATQB2 and ATQB4 responses are respectively transmitted in the first, second and fourth time slots. The responses may have the following structure:

ATQB1: PUPI1 ApplicationData1 (AFI=13h) ProtoInfo1 CRCB
ATQB2: PUPI2 ApplicationData2 (AFI=12h) ProtoInfo2 CRCB
ATQB3: PUPI3 ApplicationData3 (AFI=21h) ProtoInfo3 CRCB The first PUPI parameter corresponds to a distinctive smart card identifier associated with each AFI transmitted by the card. The smart card therefore declares virtually to the terminal the various applications or application groups selected as the distinctive smart cards. Each smart card identifier is for example generated before or during the reception of the presentation request, and stored in memory in a table of the smart card.

The terminal thus detects the various applications of the smart card as various smart cards. The second parameter defines the AFI of an application. The third parameter defines one or more parameters of the protocol associated with an application.

On expiry of the time slots, the terminal transmits a Sel selection command. Said command comprises the PUPI1 identifier and thus selects the application corresponding to the 13h AFI in the smart card. The selection command may take the following structure:

1Dh PUPI1 Param1,2,3,4 Highlayer-INF (options) CRCB

The third parameter defines the use which is carried out from the protocol specified in the ATQB1 response. The fifth parameter defines options for processing the command.

On receipt of the selection command, the smart card determines that the transaction with the terminal will use the 13h application.

The association of the PUPI identifiers with the applications or application groups is either carried out pseudo-randomly by the smart card, or predefined during its manufacture. The association of the PUPI identifiers with the applications or application groups is preferably generated before the startup and anti-collision step, in order not to extend the duration of the transaction.

Figure 3:
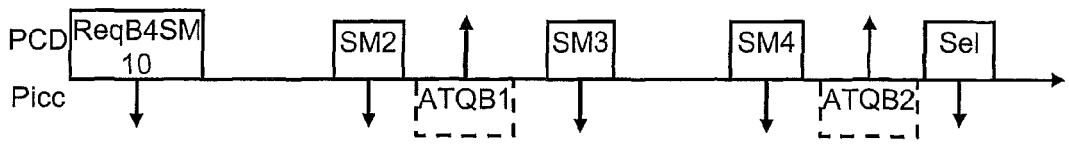

FIG. 3 illustrates a time chart of another example of exchanges during the startup and anti-collision phase.

During a first step, the terminal transmits a ReqB4SM10 presentation request of the smart cards arranged in its transmission field. Said request may take the following form:

05h 10h 02h CRCB

The 10h value of the second parameter defines that any card in the field must respond if it has any application from the lxh group. The lxh group corresponds to the transport application group in the example. The 02h value of the third parameter defines 4 response time slots. As in the preceding example, the ReqB4SM10 request and the SM2, SM3 and SM4 markers delimit the response time slots.

The first smart card has 2 applications corresponding to the request: the 12h and 13h applications. The processing module selects said two applications as corresponding to the request. The processing module therefore commands the transmission of a response for said two applications in a distinctive time slot. The ATQB1 and ATQB2 responses are respectively transmitted in the second and fourth time slots. The responses may have the following structure:

ATQB1: PUPI1 ApplicationData1 (AFI=13h) ProtoInfo1 CRCB
ATQB2: PUPI2 ApplicationData2 (AFI=12h) ProtoInfo2 CRCB The terminal processes the responses and transmits a Sel selection command. In said command, it provides the PUPI2 identifier and thus selects the application corresponding to the 12h AFI in the first smart card. The selection command may take the following structure:

1Dh PUPI2 Param1,2,3,4 Highlayer-INF (options) CRCB

Thus, the smart card determines that the 12h application will be used during the transaction with the terminal.

Figure 4:
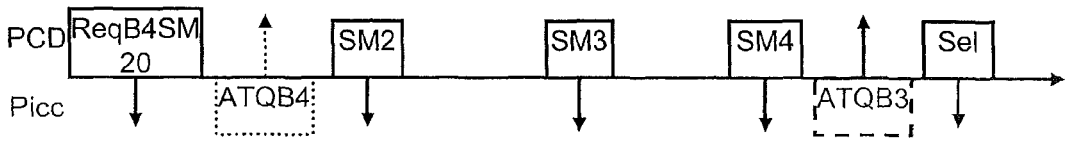

FIG. 4 illustrates a time chart of another example of exchanges during the startup and anti-collision phase, in the case where a second smart card is also present in the transmission field of the terminal. The second smart card, produced according to prior art, only has a 21h bank application.

During a first step, the terminal transmits a ReqB4SM20 presentation request of the smart cards.

The first smart card has a single application corresponding to the request: the 21h application. Its processing module selects said application as corresponding to the request. The processing module therefore commands the transmission of an ATQB3 response for said application in the fourth time slot.

The second smart card automatically responds to the request corresponding to its single AFI in the first time slot. Its response may have the following structure:

ATQB4: PUPI4 ApplicationData4 (AFI=21h) ProtoInfo4 CRCB

The terminal processes the responses from the smart cards and transmits a Sel selection command. Said command comprises the PUPI4 identifier and thus selects the application corresponding to the 21h AFI in the second smart card. The selection command may take the following structure:

1Dh PUPI4 Param1,2,3,4 Highlayer-INF (options) CRCB

Thus, the second smart card determines that it is selected and that the 21h application will be used during the transaction with the terminal.

A smart card and a method according to the invention may therefore be used without disturbing the response from smart cards according to prior art.

The invention claimed is:

1. A slave wireless device comprising:
a plurality of applications;
a wireless communication interface;
a processing module configured to interpret a presentation request received during a wireless startup and anti-collision phase and time-slotted markers received via the wireless communication interface;
wherein the processing module functions to:
select a plurality of applications or application groups corresponding to the presentation request, wherein the slave wireless device includes an identifier distinctive for each application or application group; and
transmit a plurality of responses, each of said responses comprising a slave wireless device identifier distinctive for each application or application group selected, in a distinctive time slot, in response to the presentation request,
wherein the processing module functions to transmit the identifier of an application or application group in the transmission time slot of the slave device identifier associated with said application or application group.

2. A slave wireless device according to claim 1, wherein the processing module functions to generate said wireless device identifiers and associate them with the respective applications or application groups, before or during startup of the presentation request.

3. A slave wireless device according to claim 1, wherein said slave wireless device is a smart card.

4. A method for setting up a wireless communication, comprising the following steps:
transmitting, during a wireless startup and anti-collision phase, from a master wireless device, a presentation request defining requested applications or application groups, and defining response time slots;
selecting, in at least one slave wireless device arranged in the range of transmission from said master device, applications or application groups, and
transmitting a plurality of responses, each of said responses comprising a slave wireless device identifier distinctive for each application or application group selected, in a distinctive time slot, in response to the presentation request,
wherein an identifier distinctive for each selected application or application group is transmitted in the transmission time slot of the slave device identifier associated with said selected application or application group.

5. A method for setting up a wireless communication according to claim 4, wherein said wireless device identifiers are generated and associated with the respective applications or application groups, before or during the presentation request.

6. A method for setting up a wireless communication according to claim 4, wherein the transmissions between the master and slave wireless devices comply with the specifications of the standard ISO 14443-3 type B.

* * * * *